_United States Patent_ [19]

Nakamura

[11] Patent Number: 4,880,095

[45] Date of Patent: Nov. 14, 1989

[54] VISCOUS FLUID COUPLING

[75] Inventor: Ryuji Nakamura, Okazaki, Japan

[73] Assignee: Aisin Seiki Kabushiki Kaisha, Aichi, Japan

[21] Appl. No.: 145,049

[22] Filed: Jan. 19, 1988

[30] Foreign Application Priority Data

Jan. 23, 1987 [JP] Japan .................. 62-13859

[51] Int. Cl.[4] ............................. F16D 35/00
[52] U.S. Cl. .................. 192/58 B; 192/82 T
[58] Field of Search ............ 192/58 B, 82 T; 123/41.12

[56] References Cited

U.S. PATENT DOCUMENTS

| 3,648,811 | 3/1972 | LaFlame | 192/58 B |
|---|---|---|---|
| 4,064,980 | 12/1977 | Tinholt | 192/58 B |
| 4,076,110 | 2/1978 | Tinholt | 192/58 B |
| 4,446,952 | 5/1984 | Masai | 192/58 B |
| 4,555,004 | 11/1985 | Nakamura et al. | 192/58 B |
| 4,629,046 | 12/1986 | Martin | 192/58 B |
| 4,667,791 | 5/1987 | Martin et al. | 192/58 B |
| 4,784,247 | 11/1988 | Nakamura | 192/58 B |

FOREIGN PATENT DOCUMENTS

| 3705690 | 9/1987 | Fed. Rep. of Germany | 192/58 B |
|---|---|---|---|
| 53-38836 | 4/1978 | Japan | 192/58 B |
| 53-38837 | 4/1978 | Japan | 192/58 B |
| 2166523 | 5/1986 | United Kingdom | 192/58 B |

Primary Examiner—Leslie A. Braun
Assistant Examiner—Richard M. Lorence
Attorney, Agent, or Firm—Oblon, Spivak, McClelland, Maier & Neustadt

[57] ABSTRACT

A viscous fluid coupling for use with a fan that cools as automobile engine includes a rotor driven by the engine. The rotor is housed in a housing formed by a case and a cover. A rear plate is mounted on the inner surface of the case and has an orifice. A front plate is mounted on the inner surface of the cover and has a hole through which viscous fluid can flow. A first reservoir is formed by the cover and the front plate. A second reservoir is formed by the rear plate and the case. Teeth are formed on the outer surface of the rotor. A protrusion is formed on the outer periphery of the rotor near the orifice.

8 Claims, 5 Drawing Sheets

VISCOUS FLUID COUPLING

FIELD OF THE INVENTION

The present invention relates to a viscous fluid coupling that can be used with a fan for cooling an automotive engine.

BACKGROUND OF THE INVENTION

Various viscous fluid couplings have been heretofore proposed. One known viscous fluid coupling is shown in FIG. 6, where a rotor 1 is mounted on a input shaft 2. A fluid chamber 5 consisting of sections 5a and 5b is filled with viscous fluid to transmit torque from the input to the output. The section 5a is formed by the rotor 1 and a case 3. The section 5b is formed by the rotor 1, the case 3, and a cover 4, or output shaft. A reservoir 6 stores the fluid. A member 7 which responds to temperature variations is connected to a valve 9 via a rod 8. The valve 9 is opened or closed by the member 7 via the rod 8, depending on temperature, in order to control the flow of viscous fluid between the fluid chamber 5 and the reservoir 6. Thus, the torque transmitted from the input to the output is controlled.

The above-described known coupling has a disadvantage. In particular, when the coupling is not in operation, the fluid stays in the lower art of the coupling because of gravity. Therefore, the fluid chamber 5 is filled with the fluid, as is the reservoir 6, as shown in FIG. 8. When the coupling is again set into operation, torque is transmitted from the input by the viscous fluid that fills the chamber 5. Consequently, a fan (not shown) rotates at a high speed until the fluid is pumped back into the reservoir 6 from the chamber 5. In this case, if the ambient temperature is sufficiently high, and if the valve 9 is open, then no problem will occur. However, if the temperature is low, then various problems occur. For example, the engine is not warmed up rapidly. The heater does not work well. Immediately after the restarting, the fan generates loud noise.

Accordingly, an improvement over the viscous fluid coupling shown in FIG. 6 has been proposed. This improved coupling is shown in FIG. 7 (which corresponds to U.S. patent application Ser. No. 07/017,458 now U.S. Pat. No. 4,784,247), where a second reservoir 6' is formed in the rear of the fluid chamber 5. When the coupling is not in operation, some of the fluid stays in the second reservoir 6' and so the liquid level h (see FIG. 8) drops accordingly.

In the conventional viscous fluid coupling shown in FIG. 6, when it is not in operation, the level h of the viscous fluid in the chamber 5 is high as shown in FIG. 8. This fluid in the chamber 5 transmits torque from the input. Therefore, the fan turns at a high speed. At low temperatures, loud noise is produced.

In the viscous fluid coupling shown in FIG. 7, the fluid chamber 5 is limited to a narrow area. This makes it impossible to control the coupling at will. As a result, the performance obtained heretofore is sacrificed.

SUMMARY OF THE INVENTION

It is an object of the present invention to provide a viscous fluid coupling which is free of the foregoing problems with the prior art viscous fluid couplings.

The above and other objects are achieved in accordance with the teachings of the invention by a viscous fluid coupling comprising: a shaft connected to an engine; a rotor in which the shaft is fitted, the rotor being rotatable with the shaft; an input member; an output member coupled to the input member; a case and a cover which constitute the housing of the viscous fluid coupling and in which the rotor is housed, the case and the cover being coupled together with bolts; a bearing via which the case is rotatably held to the shaft; a rear plate fitted in the case at the location where the case is in contact with the cover; a front plate mounted on the inner surface of the cover with bolts and having a hole through which oil can flow; a first reservoir formed by the cover and the front plate; a front fluid chamber formed by the front plate and the rotor; a rear fluid chamber formed by the rotor and the rear plate, the rotor and the rear plate cooperating to constitute a labyrinth near the case and the cover; and a second reservoir formed by the rear plate and the case.

When the coupling is set into operation, a temperature-responsive member consisting of a bimetal responds to the ambient temperature and causes the valve to open the hole in the front plate at high temperatures. Then, the viscous fluid flows into the fluid chambers from the reservoir. Under this condition, torque is transmitted, and a fan rotates at a high speed. At this time, the fluid does not move into the second reservoir from the fluid chamber because of rotation of the rotor relative to the cover, the pumping action of teeth formed on the outer periphery of the rotor in the direction of rotation of the rotor, the pumping action produced by rotation of the rotor relative to a protrusion close to an orifice formed in the rear plate, and the effect of the centrifugal force created by the difference in outside diameter between the second reservoir and the the fluid chambers. Therefore, the amount of viscous fluid sealed in the coupler which is sufficient to operate the coupling can be reduced to a minimum.

DETAILED DESCRIPTION OF THE PREFERRED EMBODIMENTS

Figure 1:
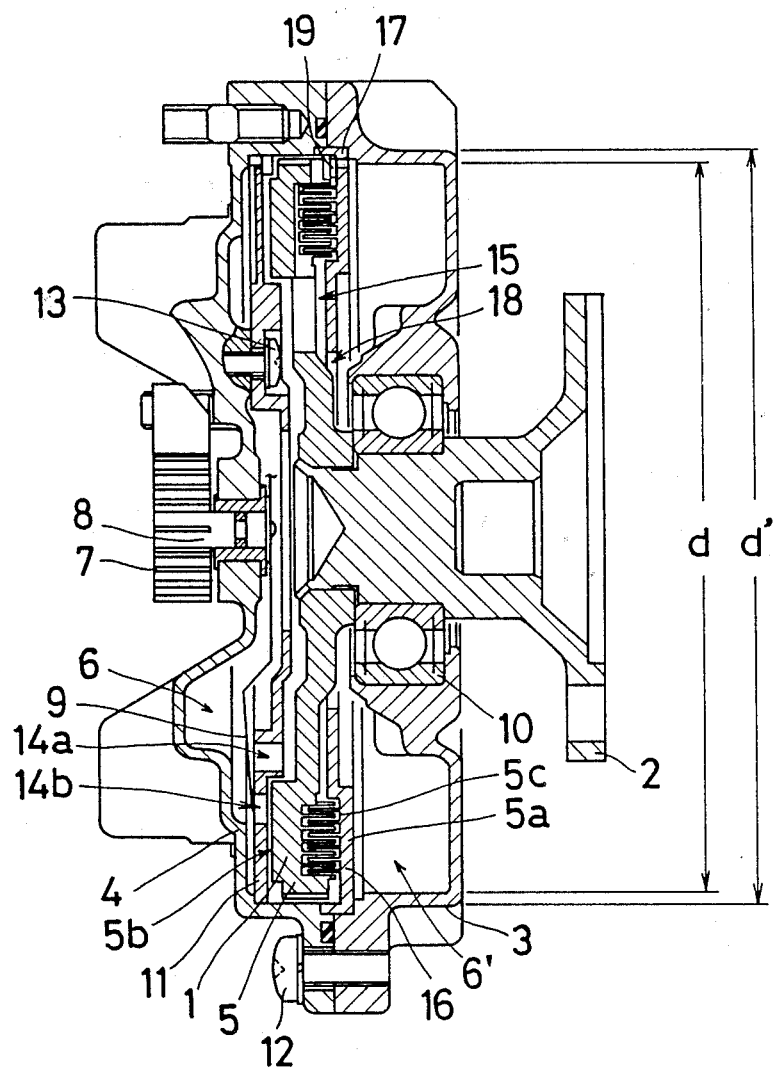
FIG. 1 is a side elevation in cross section of a viscous fluid coupling according to the invention.

Referring to FIG. 1, there is shown a viscous fluid coupling embodying the concept of the present invention. This coupling includes a rotor 1 mounted on an input shaft 2 driven by an engine 2a. The rotor 1 has teeth on its outer periphery, the number of the teeth corresponding to the rotational frequency of the rotor for pumping fluid. A case 3 is rotatably held to the shaft 2 via a bearing 10 and anchored to a cover 4, or output shaft, with screws 12. A front plate 11 is mounted to the cover 4 with screws 13 to form a reservoir 6. The front plate 11 cooperates with the rotor 1 to constitute a front fluid chamber 5b. A rear plate 16 has an outer portion pressed into the case 3 to form a second reservoir 6'. The rear plate 16 cooperates with the rotor 1 to form another or rear fluid chamber 5a and a fluid coupling means in the form of a labyrinth 5c. The second reservoir 6' has at least a portion radially outside of the labyrinth. An orifice 17 is formed in the outer surface of the rear plate 16, and extends to the outer surface of the fluid chamber 5a. A protrusion 19 is formed on the rotor near and forwardly of the orifice 17 in the direction of fluid flow due to rotation of the rotor 1. A valve 9 is secured to a member 7 via a rod 8. The member 7 responds to temperature variations, and consists of a bimetal. The front plate 11 is provided with holes 14a and 14b through which oil can flow. When temperature varies, the temperature-responsive member 7 moves to open or close the holes 14a and 14b. Thus, the amount of oil flowing between the reservoir 6 and the chamber 5 is controlled, and the torque transmitted from the input shaft 2 to the output is controlled.

Figure 3:
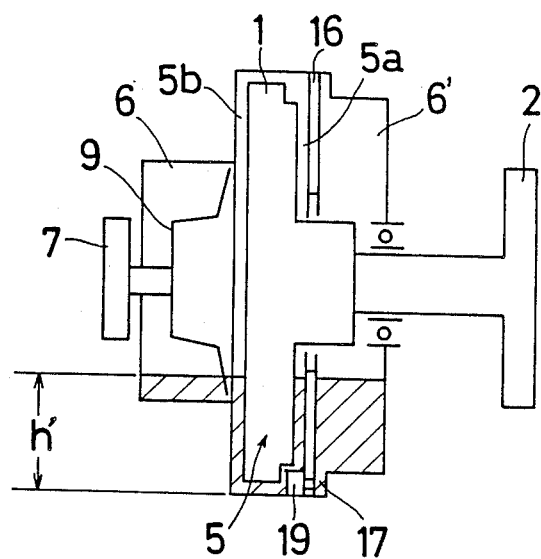
FIG. 3 is a schematic diagram of the coupling shown in FIG. 1, for illustrating the level of liquid when the coupling is not in operation.

When the viscous fluid coupling is not in operation, viscous fluid such as silicone oil stays in the lower part of the coupling, i.e., in the reservoir 6, the fluid chamber 5, and the second reservoir 6', by the action of gravity as shown in FIG. 3. When the coupling is set into operation, the rotor is rotated. The resulting centrifugal force spreads the fluid circumferentially inside the coupling. Then, the fluid is pumped back into the reservoir 6 from both the chamber 5 and the second reservoir 6'. At this time, some of the fluid remains in the second reservoir 6' as mentioned previously and, therefore, the level h' of the fluid can be made lower accordingly as shown in FIG. 3 when the coupling is not in operation. The fluid which goes back to the reservoir 6 from the second reservoir 6' passes through the orifice 17 formed in the outer surface of the rear plate 16 to replace fluid being pumped into reservoir 6. The orifice 17 acts to control or limit the amount of fluid flowing along the outer periphery of the rotor 1. The fluid which is forced into the reservoir 6 does not transmit torque when it flows along the outer periphery of the rotor. In this way, the aforementioned high-speed rotation of the fan which would have been caused at low temperatures when the coupling is restarted can be circumvented.

The rear plate 16 is formed with a pressure relief hole 18 to smoothen the recovery of the fluid flowing out of the second reservoir 6'. The hole 18 is quite important for the coupling. It is necessary that the pressure relief hole 18 be located inwardly of a hole 15 formed in the rotor 1 to allow the fluid to flow through it, in order to prevent the fluid from flowing into the pressure relief hole 18 from the hole 15 when the rotor 1 is rotating; otherwise the fluid would leak into the reservoir 6 from the fluid chamber 5. The protrusion 19 has an appropriate shape and an appropriate height, and is located near and forwardly of the orifice 17 in the direction of rotation of the rotor 1. The outside diameter d of the second reservoir 6' is equal to or smaller than the outside diameter d' of the fluid chamber 5a.

When the viscous fluid coupling begins to operate, the temperature-responsive member 7 moves according to the ambient temperature. This opens or closes the valve 9. It is assumed now that at a suitable temperature, the holes 14a and 14b in the front plate 11 are opened, i.e., the coupling is engaged. The fluid flows into the fluid chambers 5a and 5b from the reservoir 6, so that torque is transmitted. Under this condition, the fan rotates at a high speed. At this time, the fluid does not move from the chamber 5a into the second reservoir 6' because of rotation of the rotor 1 relative to the cover 4. The pumping action is produced by the teeth formed on the outer periphery of the rotor 1 and oriented in the direction of rotation of the rotor 1. Pumping action is also produced by rotation of the rotor 1 relative to the protrusion 19 close to the orifice 17, and by the effect of the centrifugal force created by the difference in outside diameter between the second reservoir 6' and the fluid chamber 5a, as mentioned previously. Consequently, the amount of fluid sealed in the coupling which is sufficient to operate the coupling can be reduced to a minimum.

At moderate temperatures, the valve 9 closes only the hole 14a in the front plate 11, while the hole 14b is open, i.e., the coupling is partially engaged. Under this condition, the fluid flows into only the fluid chamber 5b from the reservoir 6, whereby torque is transmitted. The fan is rotated at a moderate speed.

At low temperatures, the valve 9 closes the holes 14a and 14b. In this state, the coupling is disengaged. The fluid is returned into the reservoir 6 by pumping action, but does not flow back into the fluid chamber 5. Therefore, no torque is transmitted. The fan revolves at a low speed.

The second reservoir 6' is formed by pressing the outer portion of the rear plate 16 into the case 3. It is also possible to mount the rear plate 16 using screws or rivets or by roller caulking or an other method.

Figure 2:
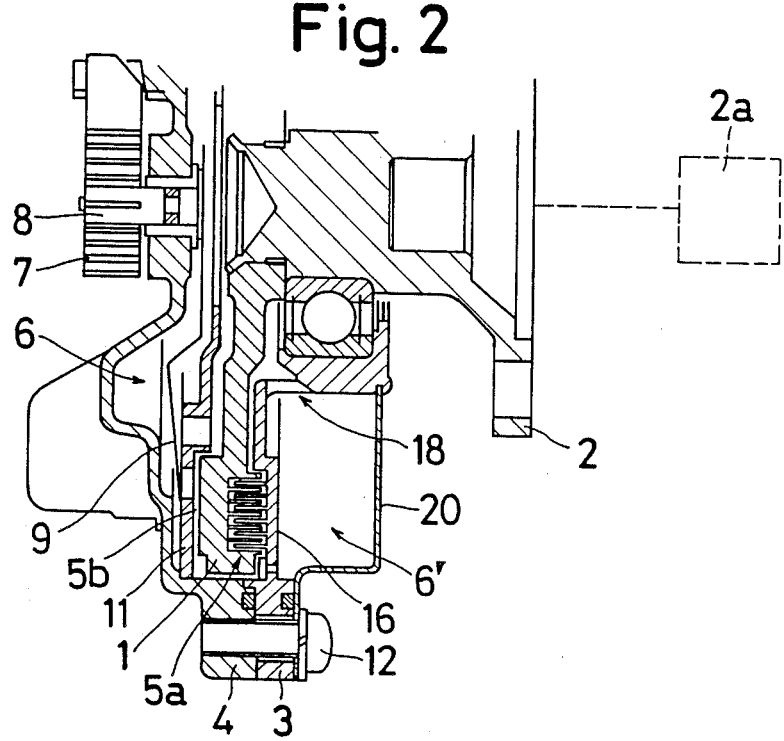
FIG. 2 is a side elevation in cross section of main portions of another viscous fluid coupling according to the invention.

FIG. 2 shows another viscous fluid coupling according to the invention. This coupling is similar to the coupling shown in FIG. 1 except that the rear plate 16 is formed integrally with the case 3 and that a rear cover 20 is provided.

Since the novel couplers are constructed as described above, the viscous fluid stays in the reservoir and the fluid chamber when the coupling is not in operation. Further, the fluid can be introduced into the second reservoir via the orifice. Accordingly, the level h' of the fluid can be lowered according to the capacity of the second reservoir. Furthermore, the aforementioned problems which would have been caused when the coupling is started at low temperatures, such as noise created by the fan, poor operation of the heater, and slow warm-up of the engine, can be solved. The fluid which flowed into the fluid chamber 5a or 5b during operation is discharged to reservoir 6 by the pumping action of rotation of the rotor relative to the protrusion, the effect of the outside diameter and the shape of the second reservoir, and the pumping action of the teeth on the outer periphery of the rotor. In addition, the fluid is prevented from flowing back into the second reservoir through the orifice by this pumping action.

Figure 4:
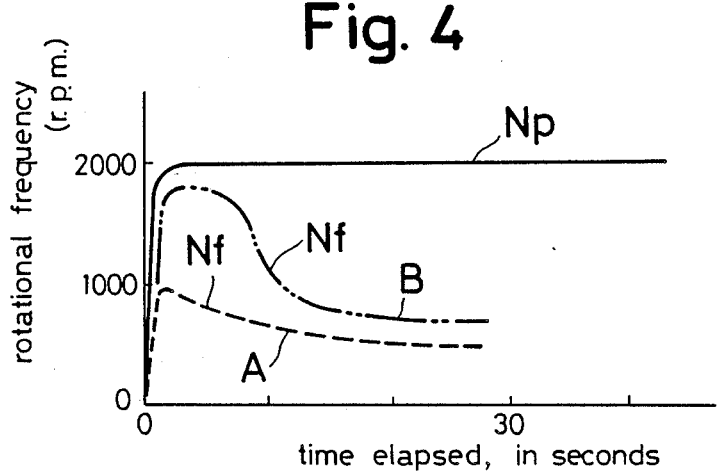
FIG. 4 is a graph showing the starting characteristics of a novel coupling and of a known coupling at low temperatures.

FIG. 4 shows a starting characteristic curve A of a novel coupling and a starting characteristic curve B of a conventional coupling at low temperatures. Curve Np indicates the input rotational frequency. Curve Nf indicates the rotational frequency of the fan, i.e., the output rotational frequency. As can be seen from this graph, the curve B indicating the frequency of the fan of the conventional coupling assumes small value after tens of seconds elapse. However, it takes quite large values immediately after the coupling is started and so the prior art coupling suffers from the above-described problems. For the novel coupling, immediately after the coupling is started, the rotational frequency is so low that the above coupling hardly suffers from the problems.

Figure 5:
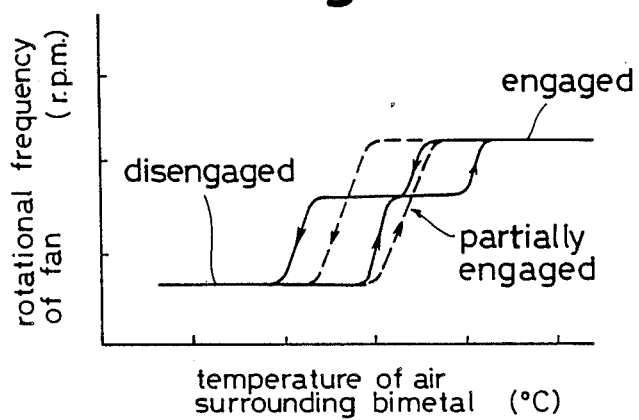
FIG. 5 is a graph for comparing a characteristic of novel coupling with a characteristic of a known coupling at normal temperatures.
Figure 6:
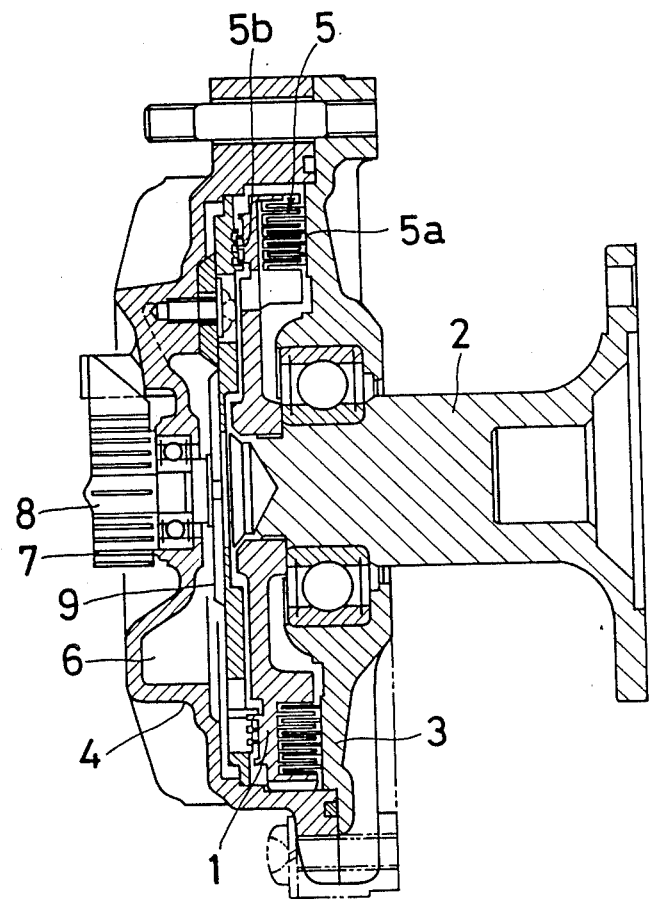
FIGS. 6 and 7 are side elevations in cross sections of known viscous fluid couplings.
Figure 7:
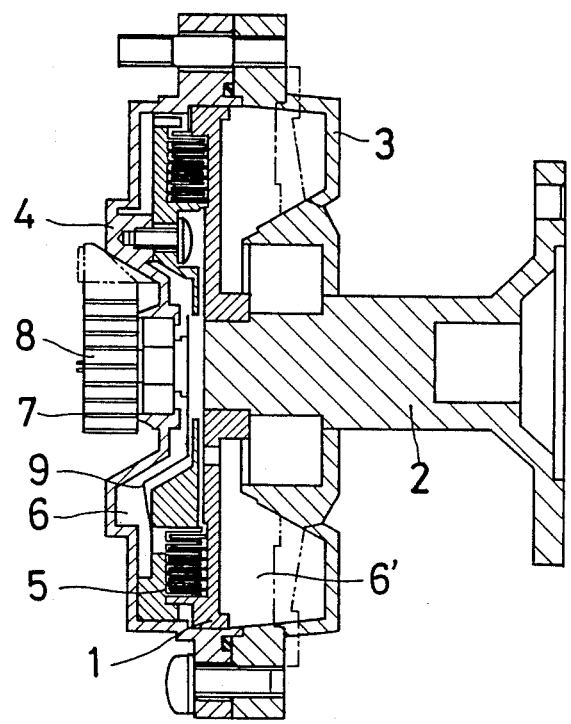
Figure 8:
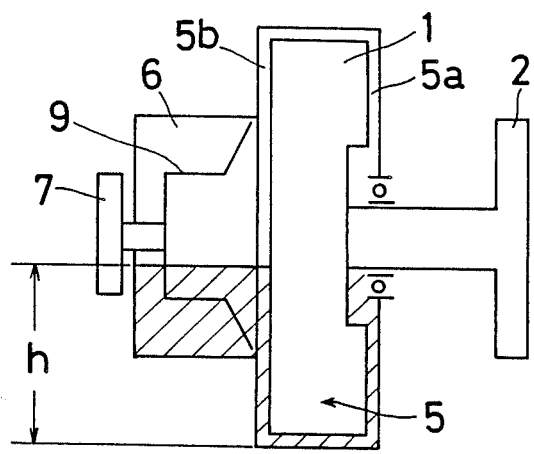
FIG. 8 is a schematic diagram of the coupling shown in FIG. 6, for illustrating the level of liquid when the coupling is not in operation.

Referring to FIG. 5, the solid lines indicate a characteristic of a novel coupling at normal temperatures, while the broken lines indicate a characteristic of a conventional coupling at normal temperatures. For the novel coupling, the curve has two horizontal portions and, therefore, the fan is less likely to rotate at high speeds. This reduces the noise produced by the fan. Also, the fuel economy can be improved.

In this way, the novel viscous fluid coupling is superior in performance to the prior art coupling and simpler in structure than the prior art coupling. Further, the weight of the novel coupling is increased only slightly compared with the prior art coupling. Also, the novel coupling is economical to fabricate. Additionally, when the coupling is installed on a vehicle, the surrounding areas are hardly affected thereby.

What is claimed is:

1. A viscous fluid coupling comprising:

a shaft connected to an engine;

a rotor fitted to the shaft, the rotor being rotatable with the shaft;

an output member comprising a case and a cover which constitute the housing of the viscous fluid coupling and in which the rotor is housed, the case and the cover being coupled together;

fluid coupling means for fluidically coupling said rotor and said output member;

bearing means for rotatably mounting said case to said shaft;

a rear plate fitted in the case at the location where the case and cover are coupled together;

a front plate mounted in the cover to define a first reservoir therebetween and having a hole through which oil can flow;

a front fluid chamber formed by the front plate and the rotor;

a rear fluid chamber formed by the rotor and the rear plate, the rotor and the rear plate cooperating to define said fluid coupling means at a radial position near the location where the case and the cover are coupled together, and a second reservoir formed by the rear plate and the case and being radially positioned such that at least a part thereof is adjacent a radially outside portion of said rear fluid chamber and radially outside said fluid coupling means.

2. The viscous fluid coupling of claim 1, wherein the rear plate has a radially outer portion provided with orifice means for communicating the rear fluid chamber with the second reservoir, and wherein the rear plate has a radially inner portion provided with a pressure relief hole near the rotor.

3. The viscous fluid coupling of claim 1, wherein the rotor has a hole through which oil can flow, and wherein the rotor has teeth on a radially outer periphery thereof to produce a pumping action, for circulating the oil sealed in the fluid chambers and in the reservoirs.

4. The viscous fluid coupling of claim 1, wherein said hole formed in the front plate to permit oil to flow therethrough extends in an axial direction, including valve means for opening and closing said hole in response to temperature variations.

5. The viscous fluid coupling of claim 2, further including a protrusion of a given height near the orifice and forwardly of the orifice in the direction of rotation of the rotor for pumping fluid from said second reservoir to said rear fluid chamber.

6. The viscous fluid coupling of claim 1, wherein the outside diameter of the second reservoir is less than the outside diameter of the rear fluid chamber.

7. The viscous fluid coupling of claim 4, wherein said valve means comprises a bimetal.

8. The viscous fluid coupling of claim 2 including oil filled in said housing to a level such that the top surface of the oil does not reach said pressure relief hole when said rotor is rotating.

* * * * *